(12) United States Patent
Wood

(10) Patent No.: US 7,231,891 B2
(45) Date of Patent: Jun. 19, 2007

(54) SHELTER

(76) Inventor: Gregory Mark Wood, Shed 2, 17-19 Beach Road, Maroochydore (AU) 4558

( * ) Notice: Subject to any disclaimer, the term of this patent is extended or adjusted under 35 U.S.C. 154(b) by 100 days.

(21) Appl. No.: 10/940,595

(22) Filed: Sep. 14, 2004

(65) Prior Publication Data

US 2005/0103280 A1    May 19, 2005

Related U.S. Application Data

(63) Continuation-in-part of application No. 10/653,700, filed on Sep. 2, 2003, now abandoned.

(30) Foreign Application Priority Data

Mar. 14, 2003    (AU) .............................. 2003201003

(51) Int. Cl.
*A01K 1/03* (2006.01)
(52) U.S. Cl. ...................................... 119/498
(58) Field of Classification Search ............... 119/482, 119/496, 498; D30/108; 135/115, 121, 132, 135/137, 143, 156, 87, 128
See application file for complete search history.

(56) References Cited

U.S. PATENT DOCUMENTS

| | | | |
|---|---|---|---|
| 3,703,181 A * | 11/1972 | Tholen ................... | 135/88.15 |
| 4,793,286 A | 12/1988 | Buxton | |
| 5,072,694 A * | 12/1991 | Haynes et al. .............. | 119/482 |
| 6,192,909 B1 * | 2/2001 | Strausser ..................... | 135/137 |
| 6,439,165 B1 * | 8/2002 | Guard ......................... | 119/496 |
| 6,899,057 B1 * | 5/2005 | Chrisco et al. ............ | 119/498 |
| D511,027 S * | 10/2005 | Mueller ..................... | D30/108 |
| 2003/0127058 A1 * | 7/2003 | Sletten et al. .............. | 119/496 |
| 2005/0103279 A1 * | 5/2005 | Brewer et al. ............. | 119/498 |

FOREIGN PATENT DOCUMENTS

| | | |
|---|---|---|
| AU | A-24937/97 | 1/1998 |
| AU | 2003201003 | 8/2004 |
| EP | 0 567 437 A2 | 10/1993 |
| JP | 2001112366 A | 4/2001 |

* cited by examiner

*Primary Examiner*—Thomas Price
(74) *Attorney, Agent, or Firm*—Laura G. Barrow

(57) ABSTRACT

A shelter is disclosed for an animal, the shelter including demountable first and second frames adapted to be releasably connectable to a flexible support and a flexible cover, providing a substantially enclosed space for receiving an animal, particularly a dog, when the shelter is in use. Each of the first and second frames, the flexible support and flexible cover are manufactured from lightweight materials. The components of the shelter can either be totally or partially dismantled to be packed together in a substantially flat configuration.

31 Claims, 4 Drawing Sheets

SHELTER

DOMESTIC AND FOREIGN CLAIMS

Under 35 U.S.C. §120, this application is a continuation-in-part application of application Ser. No. 10/653,700, filed Sep. 2, 2003, now abandoned the entire contents of which is incorporated herein by reference in its entirety, which in turn is based upon and claims the benefit of prior Australian Patent Application No. 2003201003, filed Mar. 14, 2003, the entire contents of which is incorporated herein by reference. Under 35 U.S.C. §119, the current application, like the parent case (Ser. No. 10/653,700), claims the benefit of Australian Patent Application No. 2003201003 (filed Mar. 14, 2003), the entire contents of which is incorporated herein by reference.

BACKGROUND AND SUMMARY OF THE INVENTION

This invention relates to a shelter. In particular, this invention is directed to a portable shelter that finds especial, but not limiting, use as a shelter for an animal, for example, a domestic pet such as a dog or cat.

A favorite domesticated animal is the dog. Despite its domesticity, a dog requires a cave-like quarters to rest which offer security and a comfortable sleeping accommodation elevated from the ground. Typically, such quarters are provided by the commonly known kennel.

However, a dog kennel, typically manufactured from metal or hardwood timber, is usually of a fixed construction and is generally bulky and cumbersome to transport. Such bulky fixed constructions are inconvenient when the kennel has to be moved, for example, for cleaning purposes or a change in residence.

It would thus be advantageous to provide a lightweight easily transportable shelter for an animal.

There are a number of prior art shelters which attempt to overcome the above identified disadvantages. However, such devices only address one of the problems. For example, the shelter may be transportable, but it is still relatively heavy. Another shelter may be lightweight, but it is still relatively bulky and yet others include additional features which are not necessarily required by the purchaser, such as removable litter trays and close-fitting padding to cover the animal for extra warmth, these additional features adding to the weight and cost of the shelter.

There thus remains a need for a relatively inexpensive basic lightweight, easily transportable animal shelter which, in general, is the object of the present invention.

According to a first aspect of the present invention, there is provided a shelter for an animal, the shelter including the components:
 a first frame consisting of a pair of first end frame members and a pair of first side frame members;
 a flexible support adapted to be releasably connectable to the first frame;
 a second frame consisting of a pair of second end frame members and adapted to be releasably connectable to the first frame; and
 a flexible cover releasably connectable to and supported by the second frame and adapted such that, in combination with the flexible support, provides a substantially enclosed space for receiving and supporting the animal when the shelter is in use;
 wherein the pair of first end frame members are each connectable to a corresponding end of the flexible support, and the pair of first side frame members are each connectable to a corresponding the of said flexible support, each end of the first end frame member and the first side frame member including a connector adapted to function as a releasable snap-fit connection to a respective the second end frame member; and
 wherein each of the first frame, the second frame, the flexible support and the flexible cover are manufactured from a lightweight material and are adapted such that, when said components are disassembled, the components can be stored together in a substantially flat configuration.

As a second aspect of the present invention, there is provided a shelter for an animal, the shelter including the components:
 a first frame consisting of a pair of first end frame members and a pair of first side frame members;
 a flexible support adapted to be releasably connectable to the first frame;
 a second frame consisting of a pair of second end frame members and adapted to be releasably connectable to the first frame; and
 a flexible cover releasably connectable to and supported by the second frame and adapted such that, in combination with the flexible support, provides a substantially enclosed space for receiving and supporting the animal when said shelter is in use;
 each of the first frame, the second frame, the flexible support and the flexible cover being manufactured from a lightweight material;
 wherein the pair of first end frame members are each connectable to a corresponding end of the flexible support and the pair of first side frame members are each connectable to a corresponding side of the flexible support;
 each end of the first side frame member includes a first connector adapted to function as a releasable snap-fit connection to a respective first end frame member;
 each end of the first end frame member includes a second connector adapted to function as a disengagable snap-fit connection to a respective second end frame member;
 each first connector of each first side frame member being adapted to enable each respective second end frame member to pivot about the respective first end frame member sufficient for each second frame member to be positioned substantially overlapping and near to the flexible support, with or without the flexible cover in position, sufficient for the components to be stored in a substantially flat configuration.

Preferably, the pair of second end frame members are adapted such that, when the first frame and the second frame are assembled, the second end frame members extend above the first frame to a respective apex.

Optionally, a support member can extend between and be releasably connectable to each apex.

Preferably, each end and each side of the flexible support include a sleeve through which a respective first end frame member or first side member may pass.

In a first embodiment of the present invention, the flexible cover has lower edges which are adapted to extend around respective first end and first side members of the first frame sufficient to be releasably secured to the undersurface of the flexible support.

Preferably, in the first embodiment, the lower edges of the flexible cover are secured to the undersurface of the flexible support by a hook and pile fastener commonly known as a VELCRO fastener.

In a second embodiment of the present invention, the lower edges of the flexible cover are non-releasably secured to corresponding edges of the flexible support.

Preferably, in the second embodiment, the lower edges of the flexible cover are secured to the corresponding edges of the flexible support by sewing, welding, heat fusion or any other suitable means of securing known in the art.

Preferably, in all embodiments of the present invention, the flexible support is manufactured from a mesh material. Preferably, the mesh material is a plastics material.

Preferably, the plastics material is polypropylene. Preferably, in all embodiments of the present invention, the flexible cover is manufactured from a waterproof material. Preferably, the waterproof material is selected from canvas, canvas-like or synthetic material.

Preferably, in all embodiments of the present invention, the first frame and the second frame are each manufactured from a hollow tubular material. Preferably, the hollow material is of the circular cross-section. Preferably, the hollow tubular material is manufactured from metal. Preferably, the metal is aluminium.

Preferably, in all embodiments of the present invention, each end of the connector, the first connector, and the second connector has a spigot-like projection which is retained within respective ends of the first end or side frame member, the other end of each of the connectors terminating in a shaped resilient portion adapted to function as a releasable snap-fit connection to a respective first end or second end frame member, the portion being of a shape complementary to that of the first end or the second end frame member.

Preferably, in those embodiments of the present invention where the hollow material is of the circular cross-section, the resilient portion is substantially C-shaped.

Optionally, the second end frame members include stops to limit downward movement of the first end frame members when the shelter is in use.

Preferred embodiments of the present invention will now be described with reference to the accompanying drawings.

DETAILED DESCRIPTION OF THE PREFERRED EMBODIMENT

Figure 1:
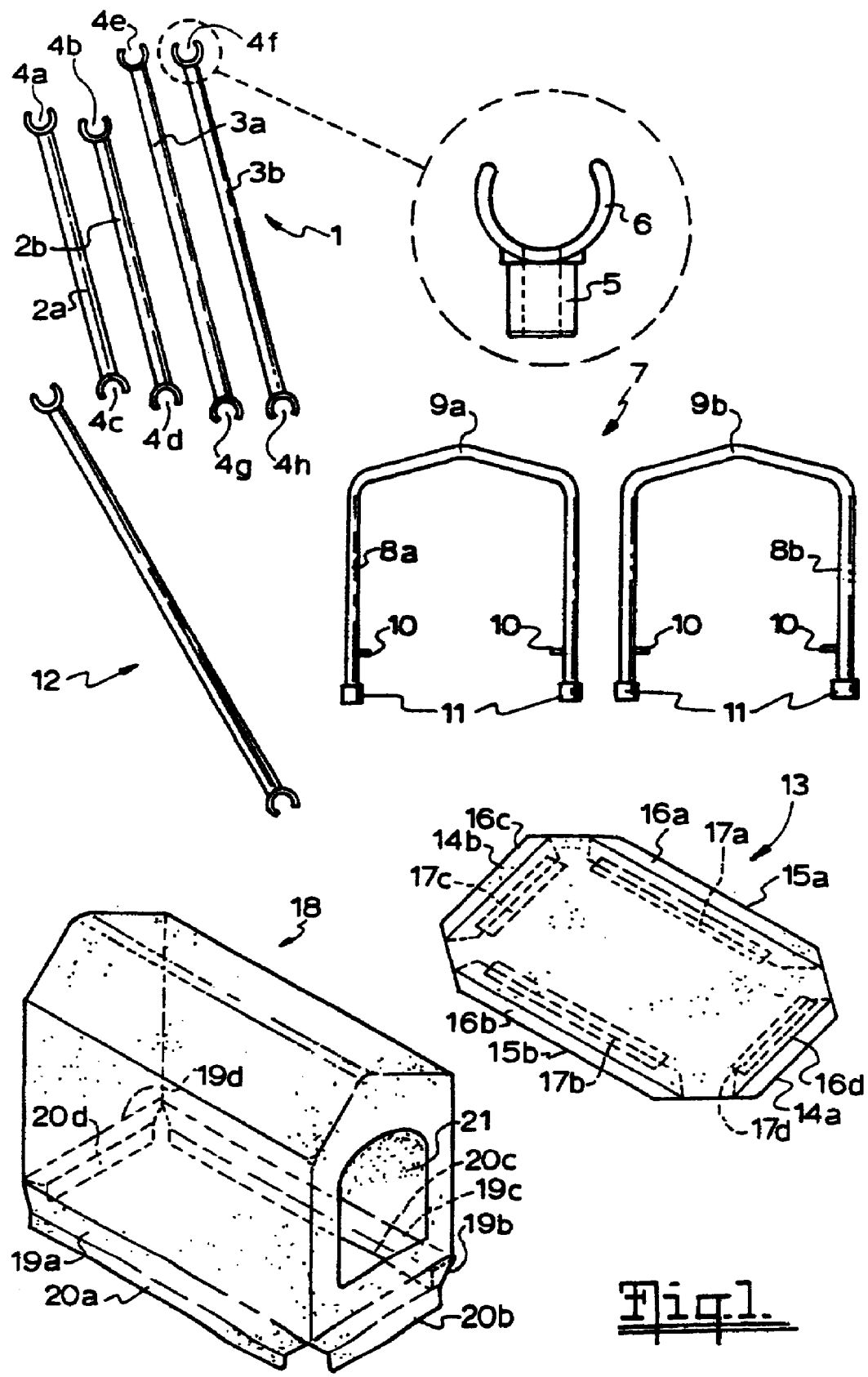
FIG. 1 illustrates the components of a shelter in accordance with the present invention when disassembled.

Referring to FIG. 1, the components of the shelter comprise a first frame (1), a second frame (7), a support member (12), a flexible support (13) and a flexible cover (18).

The first frame (1) includes two end members (2a, 2b) and two side members (3a, 3b). Each member (2a, 2b) (3a, 3b) is a hollow tube manufactured from aluminium. Each end of member (2a, 2b) (3a, 3b) incorporates a respective connector (4a-h), manufactured from polypropylene. As typified by connector (4f), each connector (4a-h) comprises a spigot-like protrusion (5) at one end and a C-shaped arm (6) at the other end; the spigot (5) being secured within the respective hollow tube member (2a,b) (3a,b). The dimensions of each C-shaped arm (6) are adapted so that it is a releasable push fit around the relevant portion of the exterior surface of the second frame (7).

The second frame (7) comprises two substantially U-shaped end members (8a, 8b). The base portion of the U-shape members (8a, 8b) is deformed slightly to create a respective apex (9a, 9b). Stops (10) are provided near the lower extremities of the arms of the end members (8a, 8b). The lower ends of the end members (8a, 8b) terminate in removable feet (11).

The support member (12) is identical in construction to the first side member (3b). The flexible support (13) is a mat-like plastic mesh of the type commonly used as sun shade material. The mesh is substantially rectangular in shape but with small triangular portions removed from the four corners. Each end (14a, 14b) and each side (15a, 15b) of the mesh are extended and folded back on themselves to be secured on the undersurface of the mesh thus forming sleeves (16a–d) through which a respective end frame member (2a, 2b) or side member (3a, 3b) may pass (see FIG. 2). Side (17a, 17b) and end (17c, 17d) strips of one half of a VELCRO material, spaced a short distance from and substantially parallel to the respective end (14a, 14b) or side (15a, 15b) of the mesh, are attached to the undersurface of the mesh with the gripping surface exposed.

Figure 2:
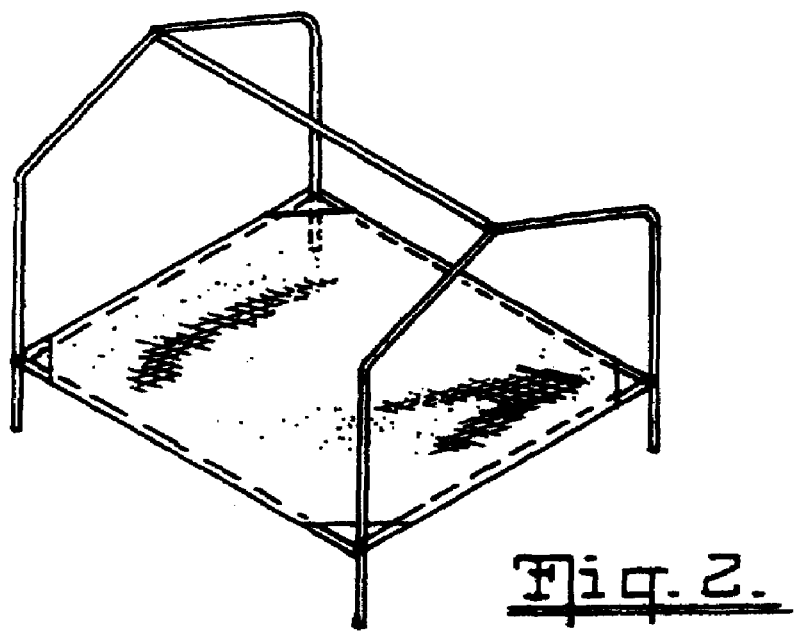
FIG. 2 illustrates the components of FIG. 1 partially assembled to form a first embodiment of a shelter.
Figure 3:
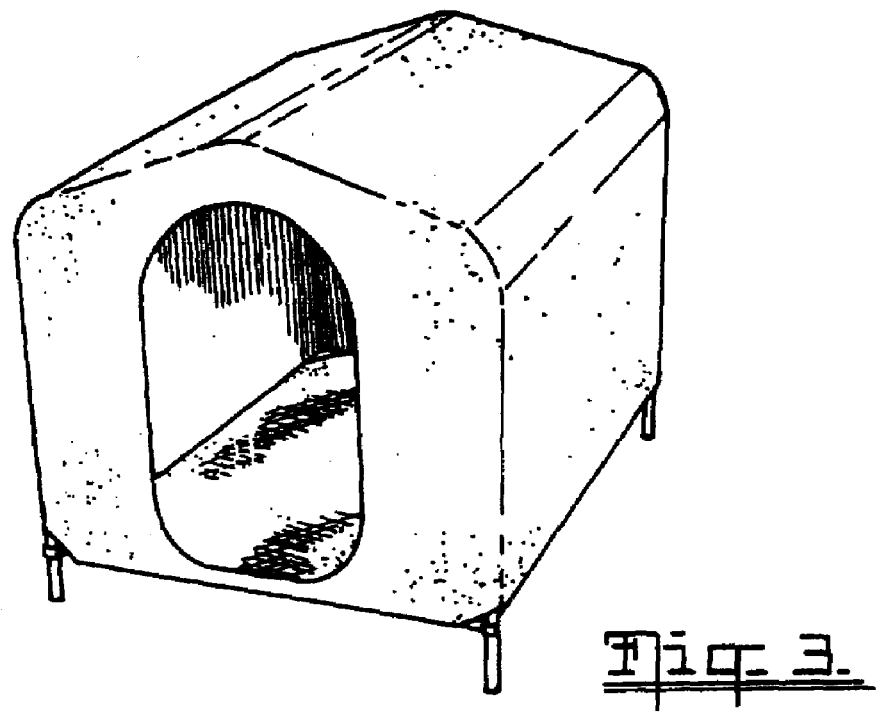
FIG. 3 illustrates a fully assembled first embodiment shelter using the components depicted in FIG. 1.

The flexible cover (18) is shaped to fit over the second frame (7) when the shelter is assembled (FIGS. 2 & 3). The lower edges of the cover (18) are extended to form flaps (19a–d) which terminate in one half of a VELCRO material (20a–d), the gripping surfaces facing inwards. This half of the VELCRO material is complementary to the strips (1 7a–d) on the undersurface of the mesh of the flexible support (13). The flaps (19a–d) are of a length sufficient to enable them to pass under the end (2a, 2b) and side (3a, 3b) members to be affixed to the strips (17a–d) when the shelter is assembled. The cover (18) includes an opening (21) of a size sufficient to function as an entrance for the animal that will use the shelter.

Turning now to FIG. 2, the frame of the shelter is assembled by passing the end members (2a, 2b) through the respective sleeves (16c, 16d) in the support (13) and affixing the respective connectors (4a–d) to the second frame members (8a, 8b). Similarly, the side members (3a, 3b) are passed through the respective sleeves (16a, 16b) in the support (13) and the respective connectors (4a–h) are affixed to the second frame members (8a, 8b). Once the connectors (4a–h) are affixed, sufficient tension is available to enable the mesh (13) to support the animal that uses the shelter. The support member (12) is affixed between the apices (9a, 9b). Should the weight of the animal cause the end (2a, 2b) and side (3a, 3b) members to slide down the second frame (8a, 8b), the stops (10) subsequently arrest that movement.

As illustrated in FIG. 3, once the frames (1,7) and flexible support (13) are in place, the flexible cover (18) can be slipped over the second frame (8a, 8b), the flaps being affixed to the VELCRO fastener on the undersurface of the mesh (13). This fastening arrangement ensures that there are no draughts between the mesh (13) and cover (18) of the shelter.

Disassembly of the shelter is simply the reverse of the procedure described above.

Figure 4:
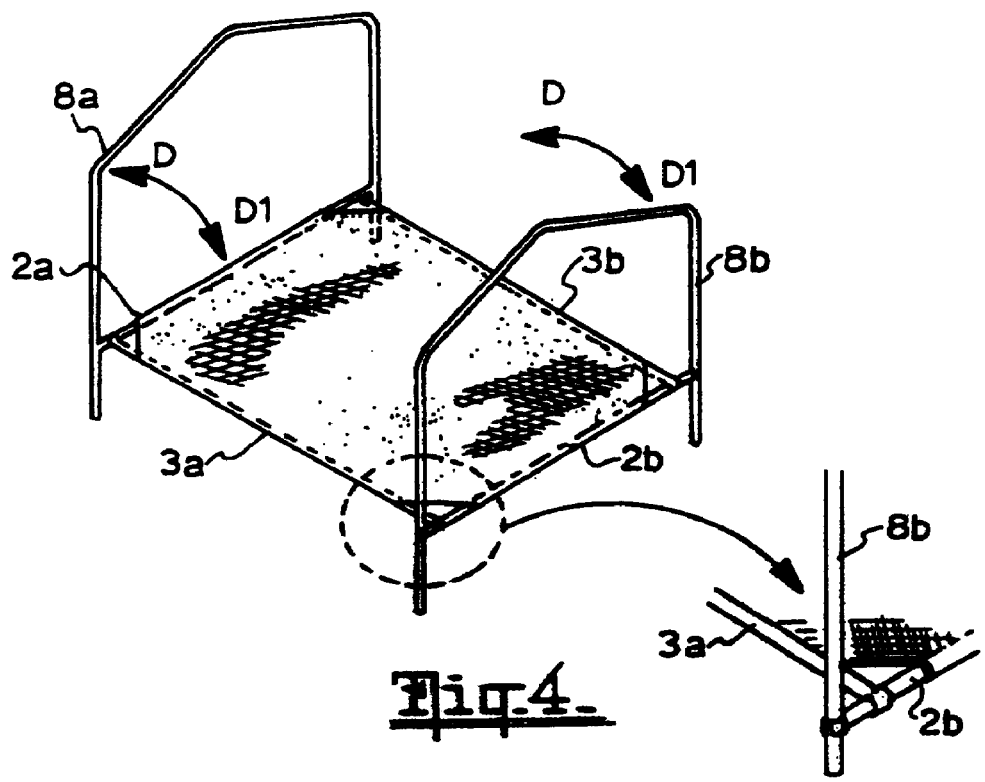
FIG. 4 illustrates the components of FIG. 1 partially assembled to form a second embodiment of a shelter.
Figure 5:
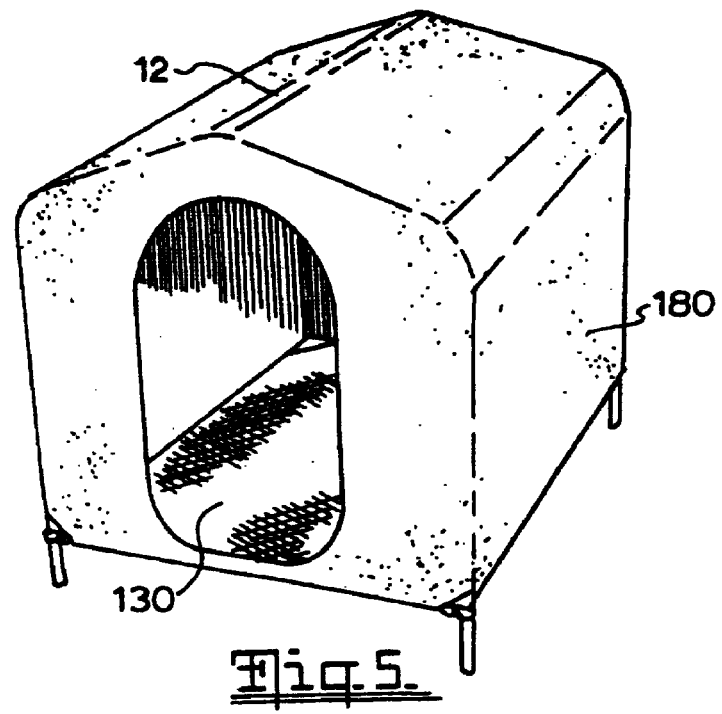
FIG. 5 illustrates a fully assembled second embodiment shelter using the components depicted in FIG. 1.
Figure 6:
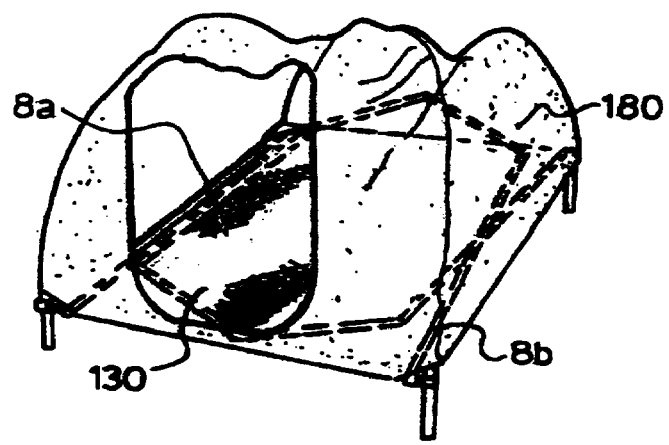
FIG. 6 illustrates a partially disassembled second embodiment of the shelter of FIG. 5.

With reference to FIGS. 4 to 6, the components of a second embodiment of the shelter comprise a first frame (1), a second frame (7) and a support member (12) which are all essentially identical to the corresponding components described with reference to FIGS. 1 to 3. However, a flexible support (130) is integral with a flexible cover (180) (FIG. 5).

As described above with reference to the first embodiment and FIG. 1, the first frame (1) includes two end members (2a, 2b) and two side members (3a, 3b). Each member (2a, 2b) (3a, 3b) is a hollow tube manufactured from aluminium. Each end of member (2a, 2b) (3a, 3b) incorporates a respective connector (4a–h), manufactured from polypropylene. As typified by connector (4f), each connector (4a–h) comprises a spigot-like protrusion (5) at one end and a C-shaped arm (6) at the other end, the spigot (5) being secured within the respective hollow tube member (2a, 2b) (3a, 3b). The dimensions of each C-shaped arm (6) are adapted so that the two side members (3a, 3b) are a releasable push fit around the relevant portion of the exterior surface of the respective end members (2a, 2b) and so that the two end members (2a, 2b) are a releasable push fit around the relevant portion of the exterior surface of the respective second frame members (8a, 8b) (FIG. 4).

As for the first embodiment described above (FIG. 1), the second frame (7) comprises two substantially U-shaped end members (8a, 8b). The base portion of the U-shape members (8a, 8b) is deformed slightly to create a respective apex (9a, 9b). Stops (10) are provided near the lower extremities of the arms of the end members (8a, 8b). The lower ends of the end members (8a, 8b) terminate in removable feet (11). Once the first and second frames (1,7) are assembled, each end member (8a, 8b) can independently pivot in the directions D–D' (FIG. 4).

Once again, the support member (12) is essentially identical in construction to the first side member (3b).

Similarly, the flexible support (130) remains a mat-like plastic mesh of the type commonly used as sun shade material. The mesh is substantially rectangular in shape but with small triangular portions removed from the four corners. Each end and each side of the mesh are extended and folded back on themselves to be secured on one side of the mesh forming sleeves through which a respective end frame member (2a, 2b) or side member (3a, 3b) may pass.

A flexible cover (180), shaped to fit over the second frame (7) when the shelter is assembled, is affixed to the edges of the sleeves of the flexible support (130) by sewing (FIG. 5). The cover (180) includes an opening of a size sufficient to function as an entrance for the animal that will use the shelter.

To assemble this second embodiment of the shelter, the end members (2a, 2b) and the side members (3a, 3b) are passed through the respective sleeves in the support (130) and the respective connectors of the side members (3a, 3b) are affixed to the end members (2a, 2b). End members (8a, 8b) of the second frame (7) are then passed through the opening in the cover (180) and the respective connectors of the end members (2a, 2b) are affixed to the respective end members (8a, 8b) of the second frame (7). The end members (8a, 8b) are then pivoted into a substantially upright position and the support member (12) is affixed between the apices (9a, 9b) (FIG. 5). Should the weight of the animal cause the end (2a, 2b) and side (3a, 3b) members to slide down the second frame (8a, 8b), the stops (10) subsequently arrest that movement.

Disassembly of the shelter is simply the reverse of the procedure described above. Alternatively, if only partial disassembly is required, the support member (12) can be removed and, with the flexible cover (180) still in place, the end members (8a, 8b) can be pivoted inwards to a position almost flush with the support (130) (FIG. 6).

The present invention can thus provide a shelter for a domestic animal, particularly a dog, having a light frame and soft base, sides and top which is collapsible and easily transportable.

It will be appreciated that the above described embodiments are exemplifications of the invention only and that modifications and alterations can be made without departing from the inventive concept as defined in the following claims.

The invention claimed is:

1. A shelter for an animal, said shelter including:
   a first frame consisting of a pair of first end frame members and a pair of first side frame members;
   a flexible support adapted to be releasably connectable to said first frame;
   a second frame consisting of a pair of second end frame members and adapted to be releasably connectable to said first frame, each of said second end frame members extending above said first frame to a respective apex;
   a support member extending between and releasably connectable to each said apex; and
   a flexible cover releasably connectable to and supported by said second frame and adapted such that, in combination with said flexible support, provides a substantially enclosed space for receiving and supporting said animal when said shelter is in use, said flexible cover has lower edges which are adapted to extend around respective said first end frame members and said first side frame members of said first frame sufficient to be releasably secured to the undersurface of said flexible support;
   wherein said pair of first end frame members are each connectable to a corresponding end of said flexible support and said pair of first side frame members are each connectable to a corresponding side of said flexible support, each end of said first end frame member and said first side frame member including a connector adapted to function as a releasable snap-fit connection to a respective said second end frame member; and
   wherein each of said first frame, said second frame, said flexible support and said flexible cover are manufactured from a lightweight material and are adapted such that, when said components are disassembled, said components can be packed together in a substantially flat configuration.

2. A shelter as defined in claim 1, wherein each end and each side of said flexible support include a sleeve trough which a respective first end frame member or first side member may pass.

3. A shelter as defined in claim 1, wherein said lower edges of said flexible cover are secured to said undersurface of said flexible support by a hook and pile fastener.

4. A shelter as defined in claim 1, wherein said flexible support is manufactured from a mesh material.

5. A shelter as defined in claim 4, wherein said mesh material is a plastics material.

6. A shelter as defined in claim 5, wherein said plastics material is polypropylene.

7. A shelter as defined in claim 1, wherein said flexible cover is manufactured from a waterproof material.

8. A shelter as defined in claim 7, wherein said waterproof material is selected from canvas, canvas-like or synthetic material.

9. A shelter as defined in claim 1, wherein said first frame and said second frame are each manufactured from a hollow tubular material.

10. A shelter as defined in claim 9, wherein said hollow tubular material is manufactured from metal.

11. A shelter as defined in claim 10, wherein said metal is aluminium.

12. A shelter as defined in claim 1, wherein one end of said connector has a spigot-like projection which is retained within respective said end of said first end frame member or said first side frame member, amid the other end of said connector terminates in a shaped resilient portion adapted to function as a releasable snap-fit connection to a respective said first end or said second end frame member, said portion being of a shape complementary to that of said first end or said second end frame member.

13. A shelter as defined in claim 12, wherein said first frame and said second frame are each manufactured from a hollow tubular material.

14. A shelter as defined in claim 13, wherein said hollow material is of circular cross-section.

15. A shelter as defined in claim 14, wherein said resilient portion is substantially C-shaped.

16. A shelter as defined in claim 1, wherein said second cad frame members include stops to limit downward movement of said first frame members when said shelter is in use.

17. A shelter for an animal, said shelter including:
   a first frame consisting of a pair of first end frame members and a pair of first side frame members;
   a flexible support adapted to be releasably connectable to said first frame, each end and each side of said flexible support include a sleeve through which a respective first end frame member or first side member may pass,
   a second frame consisting of a pair of second end frame members and adapted to be releasably connectable to said first frame; and
   a flexible cover releasably connectable to and supported by said second frame and adapted such that, in combination with said flexible support, provides a substantially enclosed space for receiving and supporting said animal when said shelter is in use;
   each of said first frame, said second frame, said flexible support and said flexible cover being manufactured from a lightweight material;
wherein:
   said pair of first end frame members are each connectable to a corresponding end of said flexible support and said pair of first side frame members are each connectable to a corresponding side of said flexible support;
   each end of said first side frame member includes a first connector adapted to function as a releasable snap-fit connection to a respective said first end frame member;
   each end of said first end frame member includes a second connector adapted to function as a releasable snap-fit connection to a respective said second end frame member; and
   each said first connector of each said first side frame member being adapted to enable each respective said second end frame member to pivot about respective said first end frame member sufficient for each said second frame member to be positioned substantially overlapping and near to said flexible support, with or without said flexible cover in position, sufficient for said components to be stored in a substantially flat configuration.

18. A shelter as defined in claim 17, wherein each of said second end frame members extend above said first frame to a respective apex.

19. A shelter as defined in claim 18, wherein a support member can extend between and be releasably connectable to each said apex.

20. A shelter as defined in claim 17, wherein said flexible cover has lower edges which are non-releasably secured to corresponding edges of said flexible support.

21. A shelter as defined in claim 20, wherein said lower edges of said flexible cover are secured to said corresponding edges of said flexible support by sewing, welding or heat fusion.

22. A shelter as defined in claim 17, wherein said flexible support is manufactured from a mesh material.

23. A shelter as defined in claim 22, wherein said mesh material is a plastics material.

24. A shelter as defined in claim 23, wherein said plastics material is polypropylene.

25. A shelter as defined in claim 17, wherein said flexible cover is manufactured from a waterproof material.

26. A shelter as defined in claim 25, wherein said waterproof material is selected from canvas, canvas-like or synthetic material.

27. A shelter as defined in claim 17, wherein one end of each of said first connector and said second connector has a spigot-like projection which is retained within respective said end of said first end frame member or said first side frame member, and the other end of said connector terminates in a shaped resilient portion adapted to function as a releasable snap-fit connection to a respective said first end or said second end frame member, said portion being of a shape complementary to that of said first end or said second end frame member.

28. A shelter as defined in claim 27, wherein said first frame and said second frame are each manufactured from a hollow tubular material.

29. A shelter as defined in claim 28, wherein said hollow material is of circular cross-sect on.

30. A shelter as defined in claim 29, wherein said resilient portion is substantially C-shaped.

31. A shelter as defined in claim 17, wherein said second end frame members include stops to limit downward movement of said first frame members when said shelter is in use.

* * * * *